PLASTIC PIPE AND COUPLING INCLUDING SAID PIPE

Original Filed Jan. 18, 1963 2 Sheets-Sheet 1

INVENTOR
Georges Henri Houot
BY J. Delattre-Seguy
ATTORNEY

PLASTIC PIPE AND COUPLING INCLUDING SAID PIPE

Original Filed Jan. 18, 1963 2 Sheets-Sheet 2

INVENTOR

Georges Henri Houot

BY J. Delattre-Seguy

ATTORNEY

United States Patent Office

Re. 27,141
Reissued June 8, 1971

27,141
PLASTIC PIPE AND COUPLING INCLUDING SAID PIPE

Georges Henri Houot, Pont-a-Mousson, France, assignor to Centre de Recherches de Pont-a-Mousson, Pont-a-Mousson, France Original No. 3,260,540, dated July 12, 1966, Ser. No. 252,430, Jan. 18, 1963. Application for reissue May 6, 1968, Ser. No. 736,235
Claims priority, application France, Jan. 31, 1962, 886,480
Int. Cl. F16l *17/02, 47/00*
U.S. Cl. 285—110 11 Claims

Matter enclosed in heavy brackets [ ] appears in the original patent but forms no part of this reissue specification; matter printed in italics indicates the additions made by reissue.

*ABSTRACT OF THE DISCLOSURE*

*A pipe element of the type that requires reinforcing when it is coupled is designed so that it can be reinforced even though it is devoid of projections or depressions and therefore easily molded. Reinforcing is carried out by reinforcing means adjacent a flange of the socket of the pipe element or of a sheath member. The reinforcing means houses a sealing element.*

The present invention relates to thermoplastic pipes and other piping elements of the type including a socket and male end, and in particular to a new design of their socket.

When the socket, constituted by the expansion of the cylindrical end of an extruded pipe, is intended for a coupling of the type employing a sealing element interposed between the male end and the socket, it must usually be reinforced by a collar, sleeve or sheath. The sheath fits around the outer face of the socket which comprises projections and recesses in the form of ribs and grooves for accommodating the sealing element and for hooking the socket onto the male end of the adjoining pipe. These grooves and ribs lead to complications as concerns the forming, moulding and assembly of both the socket and the socket sheath.

The invention therefore provides an element for piping which is composed of thermoplastic material and is of the type having a male end and socket reinforced by an outer sheath corresponding to the shape of the bell of the socket, said bell having smooth outer and inner faces which are devoid of projections and recesses and the sheath of the bell comprising a flange which projects inwardly at the entrance of the bell and forms with the sheathed bell a recess for accommodating the sealing washer.

Another object of the invention is to provide a simplified method for obtaining a socket reinforced by an outer sheath in accordance with the aforementioned features. In this method, a flange is formed inwardly at one of the ends of an initially tubular sheath, then the sheath is fitted over the bell so as to place said flange in the required axial position relative to the end of the bell and the end of the sheath opposed to said flange is formed over so as to apply it on the flared neck portion of the socket bell.

A further object of the invention is to provide a coupling between pipe elements of the aforementioned type with interposition of a sealing element which is of the type having a trapezoidal section, is compressed radially and has a circular chamfered anchoring rib projecting from the trapezoidal section, in which coupling the trapezoidal section of the sealing element is compressed radially between the bell of the socket of one of the pipe elements and the male end of the other element in the known manner, whereas the anchoring rib of the sealing element is disposed in said recess formed partly by the inwardly extending flange of the bell sheatth, and the end of the sealing element adjacent the anchoring rib bears against said flange of the sheath.

Further features and advantages of the invention will be apparent from the ensuing decription, with reference to the accompanying drawings to which the invention is in no way limited.

Figure 1:
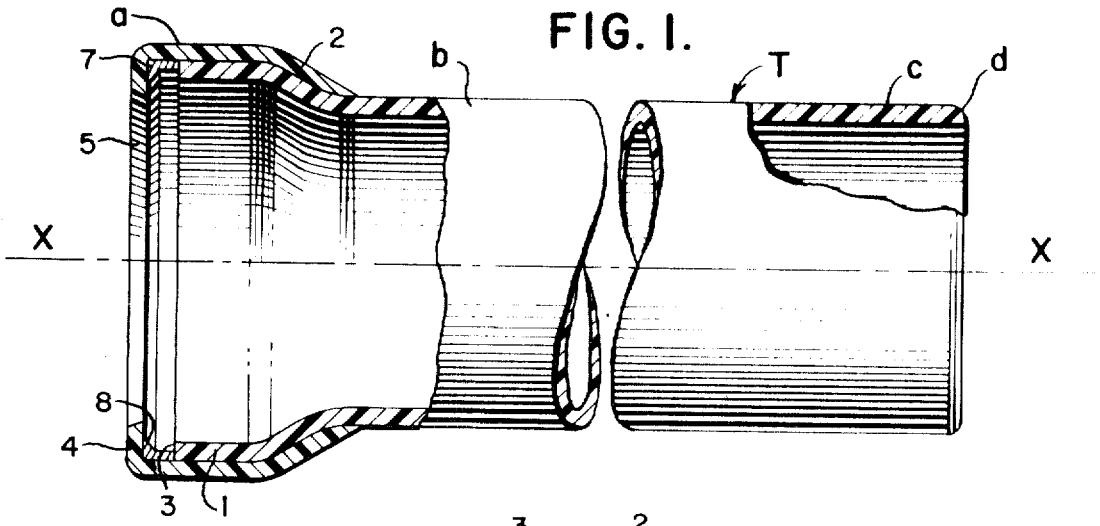
FIG. 1 is an elevational view, partly in axial section, of a pipe according to the invention.
Figure 2:
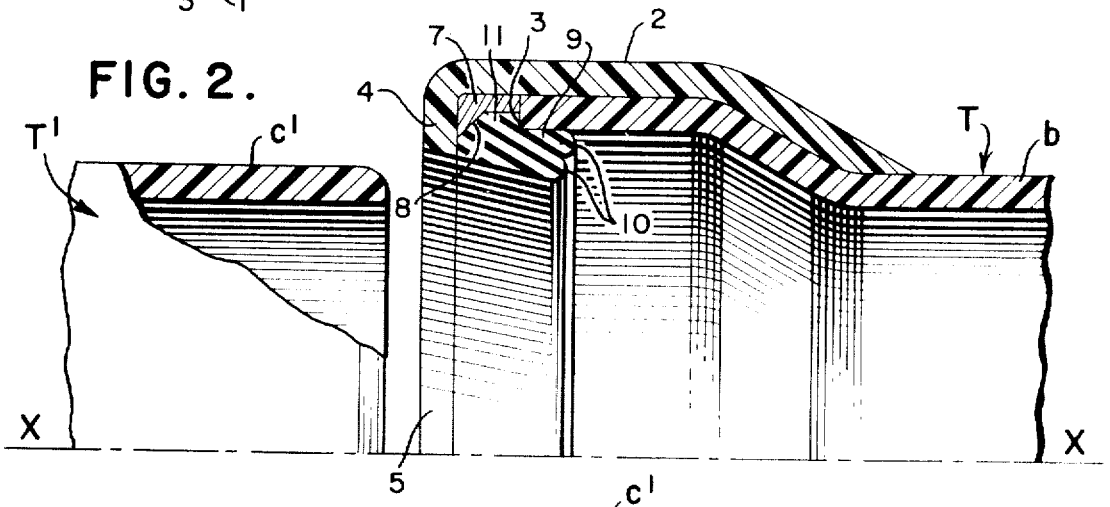
FIG. 2 is a half-axial sectional view on an enlarged scale before assembly of the male end of a pipe and the socket of another pipe in which is disposed a sealing element.
Figure 3:
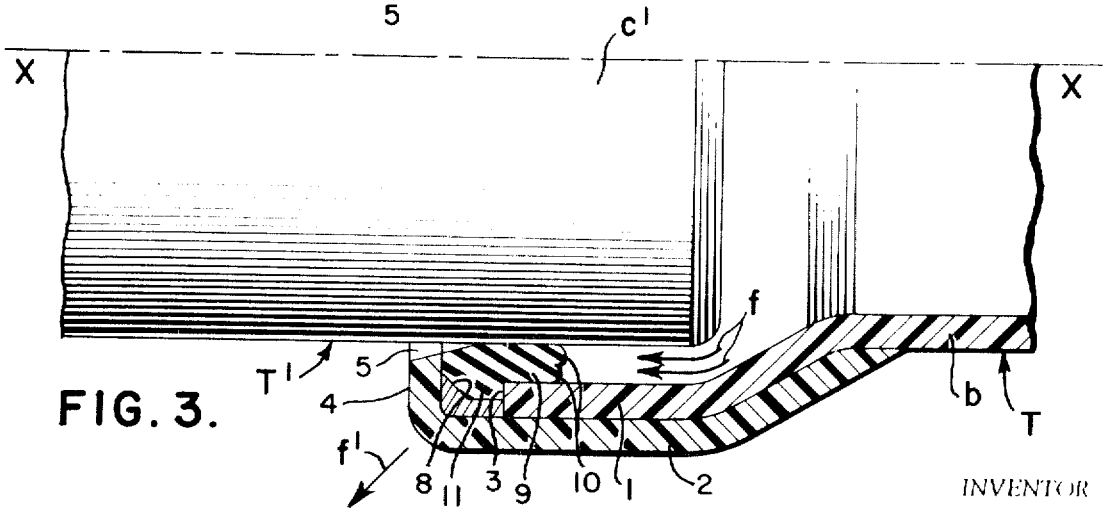
FIG. 3 is a half-axial sectional view after assembly of the pipe elements shown in FIG. 2.

In the embodiment shown in FIGS. 1–3, the invention relates to a pipe T which has an axis X—X and is of the type having a socket a and a cylindrical pipe portion b which terminates in a cylindrical and smooth male end of spigot c having a small chamfer or radius d. The pipe is composed of thermoplastic material, for example rigid polyvinyl chloride or any other mixture containing polyvinyl chloride, or a mixture containing polyolefins, polystyrene, and cellulosic derivatives.

According to the invention, the socket a of the pipe is composite. It is composed of a bell 1 which is unitary with a rubber sealing element 9 of the type having thick lips 10 and a circular anchoring rib 11 which is chamfered and has a frustoconical inner face similar to that described in French Patent No. 1,168,647 filed February 21, 1957 by the Compagnie de Pont-a-Mousson. The anchoring rib 11 of the sealing element 9 is located in a recess formed by the inner face of a ring 7, a part of the end face 3 of the bell 1 and the flange 4. The peripheral face of the outer lip of the sealing element bears against the inner face of the bell 1.

To assemble two pipes T and T' of the type just described, the male end $c^1$ (FIG. 2) of the pipe $T^1$ is brought in front of the entrance of the socket 5 of the pipe T and this pipe $T^1$ is introduced in the socket of the pipe T through the entrance until it reaches the sealing element 9. At this moment, a thrust is exerted on the male end $c^1$ so as to force it into the sealing element which is retained in position by its anchoring rib 11. In the course of the penetration, the body of the element 9 is progressively compressed in the radial direction while it freely extends in length. The presssure of contact of this element between the male end of the pipe $T^1$ and the socket of the pipe T is consequently greater and thus insures a perfect seal at both low and high internal pressure.

The composite socket a according to the invention possesses the following advantages:

The sheath 2 of the bell 1 constitutes, in the known manner, a reinforcement for this bell. Owing to the part thereof covering the flared neck of the bell 1 the sheath 2 bears against this bell and is retained by the latter in opposition to any axial force tending to remove it from the pipe. Owing to its inner face extending beyond the end face of the bell and owing to its flange 4, the sheath co-operates with the bell in accordance with the invention so as to constitute a housing for the ring 7, while its flange 4 co-operates with this ring and the end face of the bell 1 for accommodating the anchoring rib 11 of the sealing element 9. Thus the bell 1 and the sheath 2 can have smooth peripheral faces devoid of ribs or recesses and are therefore easy to produce.

The ring 7 also possesses very important advantages. It fulfills the function of a reinforcement for the sheath 2 which is fitted round its outer face. More exactly, this ring strengthens the end of the socket in the part thereof where it is thinner than the rest of the socket since it is merely constituted by the extension of the sheath 2 beyond the bell 1.

Indeed, owing to its rigidity, it insures lower, fixed, precise and stable dimensions in a permanent manner for housing the anchoring rib of the element 9 by preventing deformation of the sheath 2 and the bell 1 for example under the effect of exterior mechanical forces, in particular when handling.

Consequently, owing to the reinforcing ring 7 it is always possible to assemble or disassemble a sealing element 9 between the flange 4, the ring 7 and the end face 3 of the bell 1, since the internal dimensions of its housing remain constant.

Further, owing to its re-entrant part having a frustoconical inner face 8 the ring 7 transmits in the direction of arrow $f^1$ (FIG. 3) in the corner of the flange 4 the axial forces acting in the direction of arrows f which tend to uncouple the pipes and are due to the pressure of the fluid conveyed by the pipes which is exerted on the sealing element 9.

In other words, instead of these axial uncoupling forces exerted on the sealing element 9 in the direction of arrow f being transmitted by this element to the inner face of the entrance 5 of the socket and tending to force the flange 4 in the direction toward the periphery, that is, to straighten this flange so as to cause it to lie in the extension of the sheath 2, these axial forces are transmitted by the inner frustoconical face 8 of the ring 7 to the inner circular fillet of the corner that the flange 4 makes with the sheath 2. This inner fillet is moreover considerably reinforced by the enlarged portion of the ring 7. Consequently, the flange 4 is itself reinforced by this ring 7.

The sheath 2 and the ring 7 constitute with the bell 1 a composite socket capable of withstanding the same pressures of the fluid conveyed as the rest of the pipe T. This advantage is important since the bell of the socket, formed by the expansion of the end of the pipe T when hot, can result in a certain decrease in the wall thickness and a corresponding decrease in its burst resistance relative to that of the rest of the pipe. The sheath and the ring 7 therefore compensate such a weakening.

Figure 4:
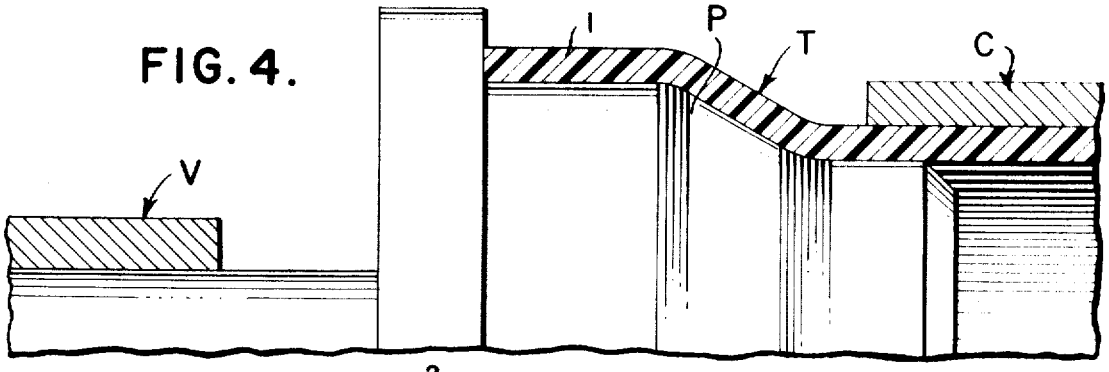
FIGS. 4, 5 and 6 are diagrammatic sectional views showing how the socket of a pipe according to the invention is formed.
Figure 5:
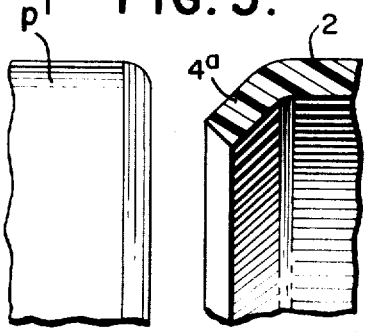
Figure 6:
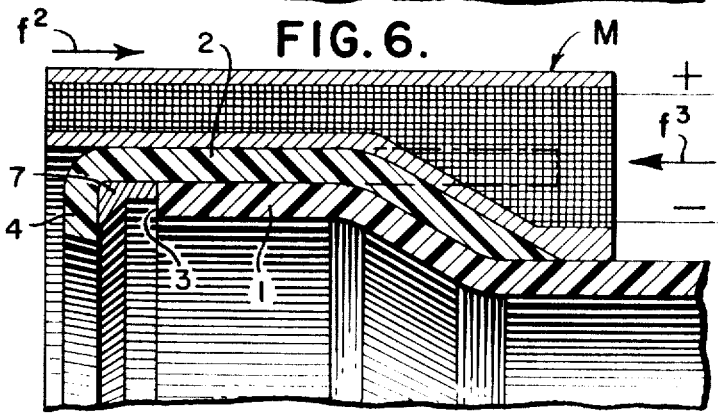

The composite socket according to the invention can be constructed by means of the apparatus known per se shown in FIGS. 4, 5 and 6. The apparatus shown in FIG. 4 for forming the bell 1 comprises a corset C in two parts adapted to maintain the rest of the pipe T during the expansion of the end of this pipe (softened by application of heat) an expanding punch P and a jack V for exerting a thrust on this punch.

The expansion is obtained by causing the punch to pene trate the cylindrical end of the pipe T, this end having been rendered plastic and deformable by application of heat at a temperature of around 130–160° C. In the case of polyvinyl chloride, FIG. 4 shows the position of the punch and releasing the pipe from the corset C, the expanded end is cooled.

Note that no internal stress is created at this temperature for expanding the bell 1. Therefore the bell is not pre-stressed.

With regard to the sheath 2, it is formed and placed in position on the bell 1 in three stages.

In the first stage, a section of a cylindrical pipe is expanded in a similar manner in a cylindrical form, but instead of effecting the expansion at a temperature of around 132–160° C. as in the case of the production of the bell 1, it is effected at a temperature of about 90–120° C. as in the case of polyvinyl chloride so as to create internal radial stresses.

In the second stage, illustrated in FIG. 5, the flange is partly formed at $4^a$ at the expanded end of the sheath. For this purpose, this end is heated to a temperature of 130–160° C., for example by immersion in hot oil. The internal stresses created in the course of the expansion are thus liberated which causes this end to shrink and start formation of the flange at $4^a$. The flange 4 is thereafter finally formed over transversely by mechanical means, for example by a punch operation with the head of a punch $P^1$.

In the third stage, illustrated in FIG. 6, the sheath 2 having the flange 4 is heat-shrunk onto the bell 1. For this purpose, after having placed the ring 7 in position in abutting relation to the flange 4, the pre-stressed sheath 2, which is initially cylindrical, is fitted over the bell 1 in the direction of arrow $f^2$ with clearance until it is stopped by the abutment of the ring 7 against the end face 3 of the bell 1.

The assembly is then placed inside a mould M which has two half-shells heated for example by electric resistances. By means of these resistances the sheath 2 is brought to a temperature of around 130–160° C. The mould M is displaced in the direction of arrow $f^3$ so as to reach the position shown in FIG. 6. There then occurs, as before, a thermic shrinkage which applies the sheath 2 tightly against the bell 1 while the end of the sheath opposed to the flange 4 is formed over onto the flared neck of the bell. After shrinkage the mould M is withdrawn and the sheath cooled.

It is therefore clear that this method of forming the socket is simple and cheap.

Figure 7:
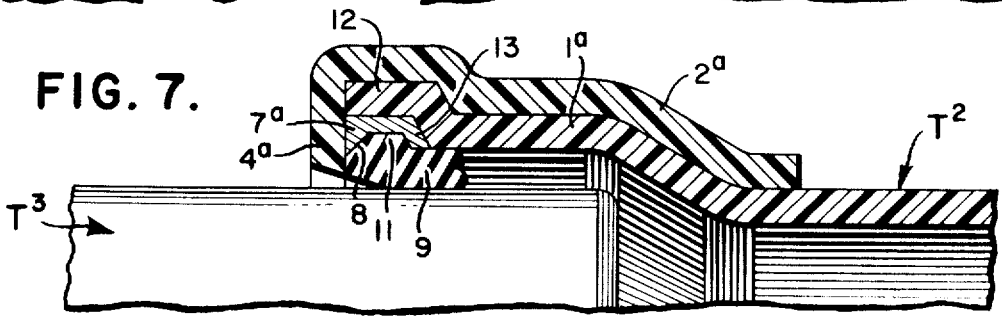
FIG. 7 is a partial axial sectional view of a modification of a pipe end and a coupling according to the invention.

In a modification shown in FIG. 7 where the plastic pipes $T^2$ and $T^3$ are thin and have a thickness of for example less than 3 mm., which is insufficient to permit the end face of the bell of the socket to form an abutment both for the rigid reinforcing ring $7^a$ and for the outer anchoring rib of the sealing element 9, a composite socket is formed in a slightly different manner than the socket shown in FIGS. 1–3. In this modification the bell $1^a$ is enlarged at its end in the form of a cylindrical entrance chamber 12. This modified bell is covered, as in the first embodiment, with a sheath $2^a$ which terminates in a flange $4^a$ which is formed over not at a certain distance from the end face of the bell $1^a$ but in the same transverse plane as this end face. A rigid reinforcing ring $7^a$ is mounted in the housing formed by the chamber 12, this ring having relative to the aforementioned ring 7 an additional inner end flange 13 forming with the cylindrical part and the frusto-conical entrance 8 a recess for completely housing the anchoring rib 11 of the sealing element 9. The element 9 also bears against the flange $4^a$. Apart from these differences, the pipe coupling is similar to that shown in FIGS. 2 and 3 and the mounting of the sealing element 9 is carried out in the same manner. Further, the composite socket shown in FIG. 7 can be obtained in the manner described hereinbefore.

Figure 8:
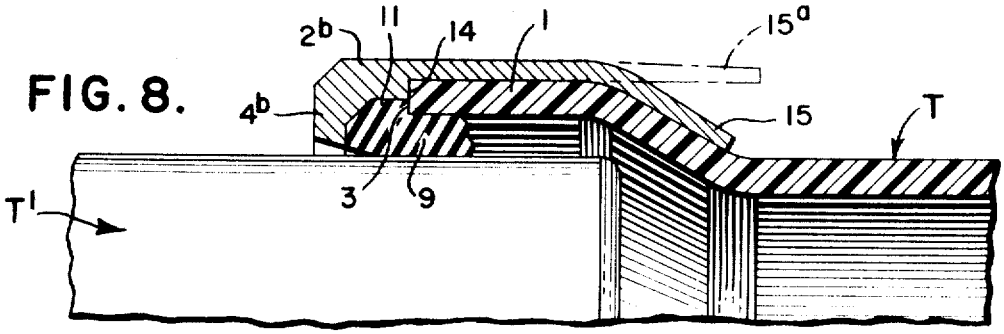
FIG. 8 is a partial axial sectional view, on the same scale as that of FIG. 2, of another modification of a pipe end and coupling.

FIG. 8 shows another modification in which the bell 1 of the socket, instead of being covered by a plastic sheath is covered by a metal collar $2^b$ replacing both the sheath 2 and the ring 7 or $7^a$ of the foregoing embodiments. This collar $2^b$ can be composed of spheroidal graphite cast iron, an aluminium alloy or a copper alloy. It comprises a relatively thin portion covering the bell 1 and a thicker portion which is extended beyond the end face of the bell and terminates in an inner flange $4^b$ so as to constitute the housing for the anchoring rib of the sealing element 9. The thicker portion of the collar $2^b$ is connected to the thin portion by an inner shoulder 14 which constitutes an abutment for the end face 3 of the bell 1 and is internally shaped in accordance with a profile corresponding to the outer profile of the anchoring rib of the element 9.

This rib is therefore located between a portion of the end face of the bell 1 and the flange 4[b] of the collar 2[b]. This collar fulfills the same function as the rings 7 and 7[a] of the foregoing embodiments and also that of the sheath for the bell 1.

The composite socket formed by the bell 1 and the collar 2[b] is very strong and robust.

This collar, whose thin portion is initially cylindrical, can be forced onto the bell 1 until its shoulder 14 abuts the end face 3 of the bell 1. Then, the end of the rear thin portion of the collar, shown in dot-dash line in its initial position at 15[a], is formed over, for example by a mechanical forming operation to the position 15 onto the flared neck of the bell 1.

Although specific embodiments of the invention have been described, many modifications and changes may be made therein without departing from the scope of the invention as defined in the appended claims.

Having now described my invention what I claim as new and desire to secure by Letters Patent is:

1. Pipe element having a cylindrical body and a composite socket, said composite socket consisting of a bell having inside and outside diameters larger than the inside and outside diameters of the body, an annular intermediate portion connecting the bell to the body, the bell, intermediate portion and body being composed of a single tube of thermoplastic material having a smooth wall of substantially constant thickness, a reinforcing sheath encompassing and in close contact with the bell and intermediate portion so as to be permanently secured thereto in the state of the pipe element before assembly with some other pipe element, the bell having an entrance end portion, the sheath having an inner flange adjacent to but axially spaced from the entrance end portion of the bell, a recess in the composite socket defined partly by the flange, partly by a portion of the sheath immediately adjacent the flange and partly by the entrance end portion of the bell, a rigid reinforcing ring engaged in the recess in close reinforcing contact with the flange, the portion of the sheath immediately adjacent the flange and the entrance end portion of the bell as to rigidly reinforce the composite socket in the region thereof adjacent the flange, the ring having a hollow annular inner face comprising a cylindrical portion remote from the flange and a substantially frustoconical portion adjacent the flange and convergent outwardly of the pipe element, and an annular sealing element engaged in the hollow annular inner face of the ring and engaged with the flange and the bell, said sealing element extending radially inward a distance greater than that of the flange on the sheath.

2. Pipe element as claimed in claim 1, wherein the ring further comprises an inner flange portion at the end of the ring remote from the flange of the sheath, the sealing element also engaging the inner flange portion of the ring.

*3. A thermoplastic pipe element having a cylindrical body and a socket, said socket having inside and outside diameters larger than the inside and outside diameters of the body, said socket having an inner flange adjacent an entrance end portion and a recess defined partly by the flange and partly by the entrance end portion of the socket, a rigid reinforcing ring engaged in the recess in close reinforcing contact with the flange and the entrance end portion of the socket so as to rigidly reinforce the socket in the region thereof adjacent the flange, the ring having a recessed annular inner face, the axial thickness of said flange and radial thickness of said reinforced region of said socket adjacent said flange being substantially the same, the recessed annular inner face of said rigid reinforcing ring being a housing for a portion of an annular sealing element extending radially inward a distance greater than that of the flange.*

*4. A thermoplastic pipe element as defined in claim 3 wherein said cylindrical body and socket are fabricated of thermoplastic tubular stock.*

*5. A thermoplastic pipe element as defined in claim 3 wherein said socket is comprised of a bell portion and a reinforcing sheath encompassing and in close contact with the bell, said bell and cylindrical body being composed of a single tube of thermoplastic material, said inner flange being integral with said sheath and being composed of a single annulus of thermoplastic material.*

*6. A pipe element as defined in claim 5 wherein said recessed annular inner face of said reinforcing ring comprises a cylindrical portion remote from said flange and a substantially frustoconical portion convergent outwardly toward and adjacent to said flange.*

*7. A pipe element as defined in claim 3 wherein said recessed annular inner face of said reinforcing ring comprises a cylindrical portion remote from said flange and a substantially frustoconical portion convergent outwardly toward and adjacent to said flange.*

*8. A thermoplastic pipe element having a cylindrical body and a socket, said socket having inside and outside diameters larger than the inside and outside diameters of the body, said socket having an inner flange adjacent an entrance end portion and a recess defined partly by the flange and partly by the entrance end portion of the socket, a rigid reinforcing ring engaged in the recess in close reinforcing contact with the flange and the entrance end portion of the socket so as to rigidly reinforce the socket in the region thereof adjacent the flange, the ring having a recessed annular inner face, a unitary annular sealing element positioned within said socket with at least a portion of the outer face of said sealing element being in contact with said recessed annular inner face of said reinforcing ring, said portion of said outer face of said sealing element substantially conforming to the configuration of said recessed annular inner face, the configuration of said socket recess being different from the configuration of said recessed annular inner face, said sealing element extending radially inward a distance greater than that of the flange.*

*9. A pipe element as defined in claim 8 wherein said recessed annular inner face of said reinforcing ring comprises a cylindrical portion remote from said flange and a substantially frustoconical portion convergent outwardly toward and adjacent to said flange.*

*10. A pipe element having a cylindrical body and a composite socket, said socket consisting of a bell having inside and outside diameters larger than the inside and outside diameters of the body, an annular intermediate portion connecting the bell to the body, the bell, intermediate portion and body being composed of a single tube of thermoplastic material having a wall of substantially constant thickness, a reinforcing sheath encompassing and secured in fixed position directly to said bell in the state of the pipe element before assembly with some other pipe element, the bell having an entrance end portion, the sheath having an inner flange adjacent to but axially spaced from the entrance end portion of the bell, a recess in the composite socket defined partly by the flange, partly by a portion of the sheath immediately adjacent the flange and partly by the entrance end portion of the bell, rigid reinforcing means in close reinforcing relationship with the flange, the portion of the sheath immediately adjacent the flange and the entrance end portion of the bell so as to rigidly reinforce the composite socket in the region thereof adjacent the flange, said reinforcing means having a recessed annular inner face comprising a cylindrical portion remote from the flange and a substantially frustoconical portion adjacent the flange and convergent outwardly of the pipe element, and an annular sealing element engaged in the recessed annular inner face of said reinforcing means and engaged with the flange and the bell, said sealing element extending radially inward a distance greater than that of the flange on the sheath.*

*11. A pipe element having a cylindrical body and a com-*

*posite socket connected to said body, said composite socket comprising a bell having inside and outside diameters larger than the inside and outside diameters of the body, said bell and body being composed of a single tube of thermoplastic material having a wall of substantially constant thickness, said bell having an entrance end portion, a reinforcing sheath encompassing and secured in fixed position directly to said bell in the state of the pipe element before assembly with another pipe element, said sheath having an inner flange, adjacent to but axially spaced from said entrance end portion of said bell, an annular recess in the composite socket defined partly by said flange, partly by a portion of said sheath immediately adjacent said flange and partly by the entrance end portion of said bell, at least a portion of said entrance end portion of said bell extending radially inwardly from said sheath to provide an abutment facing in the direction of said flange, an annular sealing element seated in said recess, said sealing element having a radially outwardly extending projection intermediate its axially extending ends which abuts against said abutment formed by said entrance end portion of said bell, said sealing element extending radially inward a distance greater than that of said flange on said sheath, and rigid reinforcing means in close reinforcing relationship with said flange, the portion of said sheath immediately adjacent said flange and the entrance end portion of said bell so as to rigidly reinforce the composite socket in the region thereof adjacent said flange.*

References Cited

The following references, cited by the Examiner, are of record in the patented file of this patent or the original patent.

UNITED STATES PATENTS

| | | | |
|---|---|---|---|
| 341,552 | 5/1886 | Carter | 264—249 |
| 985,182 | 2/1911 | Lang | 285—284 |
| 993,661 | 5/1911 | Dudley | 285—284 |
| 1,357,311 | 11/1920 | Buente. | |
| 1,729,901 | 10/1929 | Simonds et al. | 264—249 |
| 2,508,716 | 5/1950 | Hauf | 285—231 |
| 2,685,460 | 8/1954 | Ogborn | 285—231 |
| 2,922,665 | 1/1960 | Beyer | 285—105 |
| 3,020,054 | 2/1962 | Draincourt | 277—207 |

FOREIGN PATENTS

| | | | |
|---|---|---|---|
| 550,676 | 9/1956 | Belgium | 285—112 |
| 74,464 | 7/1952 | Denmark | 285—112 |
| 1,164,871 | 5/1958 | France | 285—291 |
| 1,224,963 | 2/1960 | France | 285—111 |
| 1,140,156 | 11/1962 | Germany | 285—374 |
| 839,914 | 6/1960 | Great Britain | 285—111 |
| 590,117 | 3/1959 | Italy | 285—111 |

OTHER REFERENCES

Stewart-Warner: Belgium Printed Abstract No. 608,270, filed Sept. 7, 1961. Note: British Duplicate Serial Number 940,833, published Nov. 6, 1963.

THOMAS F. CALLAGHAN, Primary Examiner

U.S. Cl. X.R.

285—423

UNITED STATES PATENT OFFICE

CERTIFICATE OF CORRECTION

Patent No. Reissue No. 27,141 Dated June 8, 1971

Inventor(s) Georges Henri Houot

It is certified that error appears in the above-identified patent and that said Letters Patent are hereby corrected as shown below:

Column 2, line 34, "of" should read -- or --.

Signed and sealed this 19th day of October 1971.

(SEAL)
Attest:

EDWARD M.FLETCHER,JR.
Attesting Officer

ROBERT GOTTSCHALK
Acting Commissioner of Patents

USCOMM-DC 60376-P69
U.S. GOVERNMENT PRINTING OFFICE : 1969 O—366-334